though to accomplish by heat alone, in the absence of the quinone-initiator combination, because of the tendency of the copolymerization to go to completion.

3,300,544
1,4 NAPHTHOQUINONE AS POLYMERIZATION CONTROLLER IN B-STAGING UNSATURATED POLYESTER
Phillip H. Parker, Jr., San Rafael, Calif., assignor to Chevron Research Company, a corporation of Delaware
No Drawing. Filed Apr. 6, 1965, Ser. No. 446,081
7 Claims. (Cl. 260—866)

This is a continuation-in-part of copending application Serial No. 214,856, filed August 6, 1962, which in turn is a continuation-in-part of application Serial No. 18,827, filed March 31, 1960, now abandoned.

This invention relates to the copolymerizable curable mixtures of ethylenically unsaturated monomers and ethylenically unsaturated resinous reaction products of a polycarboxylic acid and a polyhydric alcohol, the curing characteristics of which are modified by the inclusion of a polymerization modifier combination; to the artificial resinous articles or products which can be produced therefrom; and to methods for their preparation.

Copolymerizable mixtures of ethylenically unsaturated monomers and ethylenically unsaturated polyesters, i.e., resinous reaction products of a polycarboxylic acid and a polyhydric alcohol, are very useful for the production of surface coatings, molded articles, laminated bodies, and the like. The copolymerizable mixtures are generally fluid and undergo vinyl or addition copolymerization by cross-linking to yield infusible thermoset resins.

Problems have been encountered in the production of large volume articles, involving both bulk polymers and multi-ply laminates, from these copolymerizable mixtures because of the inability to control the cross-linking reaction once it has begun. The cross-linking reaction, once started, goes to completion. Accordingly, the usefulness of these mixtures has been limited by processing difficulties due to the fact that the mixtures have been processable only in the fluid state, i.e., requiring the fabricator employing these mixtures to use them in the fluid state or to use compositions restricted to specific materials. In other words, it has not been found generally expedient to obtain polymeric mixtures of various degrees or stages of polymerization, such as the three stages A, B, and C, characteristic, for example, of the phenolic resins. As is known, three molecular stages are recognized and often referred to in the art of thermoset phenolic resins: A-stage resin, consisting of comparatively short, linear, functional molecules, usually liquid and soluble in a number of solvents and fusible; B-stage resin composed of longer chains, still functional and usually solid, the B-stage resin being relatively insoluble but still fusible; and C-stage resin, which is so cross-linked that it is infusible and insoluble. (See Principles of High-Polymer Theory and Practice, Schmidt and Marlies, McGraw-Hill (1948), p. 92.) The ability to obtain polyesters of the B-stage type is highly desirable, and its practical advantage can conveniently be illustrated in the application of the resin not only to a mold or applied as surface coating to an article, but also in the impregnation of a filler, such as a fabric or fibrous base, particularly in the formation of prepregs, followed by infusibilization or resinification.

Thus, in the formation of prepregs the copolymerizable mixture is impregnated in a fibrous sheet-form reinforcing material, such as glass cloth or mat, cotton, linen, paper, and synthetic woven materials including nylon and Orlon. The combined resin and glass cloth or mat can be obtained in catalyzed ready-to-use sheet rolls which can be made into preforms or laid up directly on a mold. Subsequent copolymerization yields a rigid structure which may have any desired shape depending on the shape in which the mat is held during copolymerization. When a plurality of mats impregnated with the copolymerizable mixture is placed together during copolymerization, valuable laminated materials are produced having exceptional strength.

Current commercial producers of ethylenically unsaturated prepregs are confronted by the problem that not all conventional cross-linking or copolymerizing monomers are satisfactory, for in general, once vinyl polymerization is initiated it proceeds to completion and an infusible resin is obtained. If no polymerization is carried out, the more volatile monomers, e.g., styrene, are volatilized and lost from the composition. Accordingly, presently commercially available ethylenically unsaturated prepregs are restricted to expensive copolymerizing monomer material such as diallyl phthalate which is used as a nonvolatile physical mixture in which substantially no copolymerization has taken place.

In accordance with the present invention, the cross-linking reaction can be controlled short of completion by modifying the reaction and thus produce a polymeric resin of intermediate or B-stage, further polymerizable to the final, infusible stage. In other words, the present invention provides means for controlling the extent of the reaction similar to the three stages characteristic of phenolic resin manufacture. Stage-B polyesters are produced which are more nearly similar to stage-B phenolics. As a result, copolymerizable monomer is entrapped in the B-stage resinous compositions and thus preserved to the composition.

It has now been found that the copolymerization of ethylenically unsaturated monomers and ethylenically unsaturated polyesters can be modified and that B-stage unsaturated polyesters can be produced by incorporating in the copolymerizable mixture a minor amount of 1,4-naphthoquinone ($\alpha$-naphthoquinone) polymerization modifier, together with a minor amount of a free-radical initiator, such as methylethylketone peroxide, the modifier and free-radical initiator being used in critical proportions. In carrying out the invention, such ratios ranging from about 1:2.5, preferably 1.5:1 to 2.5:1 are used.

As illustrations of suitable free-radical initiators, there can be mentioned peroxidic compounds, such as methylethylketone peroxide, benzoyl peroxide, cumene hydroperoxide, t-butyl peroxide; azo compounds, such as azo-bis-isobutyronitrile; light-activated initiators, such as benzoin. The free-radical initiator is employed in an amount of from 0.005 to 5.0, and preferably from 0.01 to 2.0, weight percent, based on the sum of the weights of the monomer and polyester, so long as the aforesaid ratio of substituted quinone and free-radical initiator is maintained.

The manner of incorporating the modifying combination of free-radical initiator and 1,4-naphthoquinone is not critical. Conveniently, the addition of these agents is made during the mixing step of monomer and polyester or after the two are mixed. The temperature employed to effect polymerization to the B-stage will depend on the initiator used. This temperature is simply governed by the half-life of the initiator, which can be determined from the literature. For example, in the use of benzoyl peroxide, B-staging polymerization temperatures above 60° C. will be satisfactory, whereas with methylethylketone peroxide and cobalt naphthenate activator, a temperature of about 25° to 60° C. will be satisfactory.

As indicated, the new modifier combination of the invention permits rapid partial polymerization of the mixture to a solid but will substantially inhibit or stop copolymerization of the mixture thereafter, thereby producing a B-staged, fusible solid copolymerizable mixture containing the monomer, the polyester, and some copolymer of the monomer and polyester. The production of these solid copolymerizable mixtures has been very difficult heretofore because the production of some copolymer in the mixture has resulted in complete copolymerization of the mixture. The solid copolymerizable mixtures which can be produced by this invention are very useful because they greatly increase the efficiency with which desired resins can be produced and/or used.

The B-stage resin can be used alone or in combination with fillers. For instance, fibrous sheetform reinforcing filler material, e.g., glass cloth or mat, in amounts of 5 to 80%, preferably around 40%, by weight, of combined glass and resin, may be impregnated in conventional manner, e.g., by dipping or solvent deposition, spreading or the like, with the fluid copolymerizable mixture including the modifier of this invention, and partially polymerized to produce a dry, flexible reinforced plastic which may be formed into tack-free rolls and stored for long periods of time, i.e., one month or more.

Similarly, useful products can be obtained by the incorporation of the B-stage polyester with non-fibrous particulate filler material, for example, clay or sand; or with asbestos, cork, calcium carbonate, and the like, to prepare premix or gunk molding compositions, useful, for example, in the manufacture of composition tiles.

In combining the B-stage resin with the filler material, the components of the B-stage resin may be incorporated with the filler prior to partial polymerization, and then partially polymerized to the B-stage, or the preformed B-stage resin may be simply incorporated with the filler material.

The B-stage treated dry product may then be layered, molded and shaped, and polymerization initiated a second time to produce the finally desired insoluble, infusible rigid filled article, such as laminated cloth, glass fiber, tile, and the like. The second copolymerization can be initiated by any convenient free radical mechanism such as high temperature alone or by decomposition of a peroxide catalyst. This peroxide may be included in the original fluid copolymerizable mixture, or it may be added mechanically to the solid B-stage resin.

The modifier composition of this invention is effective in producing the B-staged copolymerizable solids from a wide variety of mixtures of ethylenically unsaturated monomers and ethylenically unsaturated polyesters conventionally employed in the art of unsaturated polyester manufacture useful in the reinforced plastics art, molding, and surface coating. The monomer present in the mixture is an ethylenically unsaturated compound capable of vinyl or addition polymerization. Specific examples of these monomers are styrene, α-methyl styrene, p-methyl styrene, chloro styrene, divinyl benzene, indene, cyclopentadiene, butadiene, vinyl acetate, methyl methacrylate, methyl acrylate, allyl acetate, diallyl phthalate, diallyl succinate, diallyl adipate, diallyl sebacate, diethylene glycol bis (allyl carbonate), triallyl phosphate, vinyl chloride, acrylonitrile, triallyl cyanurate.

While this modifier is most useful in modifying free radical copolymerizations of ethylenically unsaturated polyesters and ethylenically unsaturated monomers, its adaptation to modifying any free radical polymerization, such as the homopolymerization of an ethylenically unsaturated monomer, such as styrene or any of vinyl monomers capable of free radical polymerization is readily apparent.

The unsaturated polyester employed in the mixture with the polymerizable monomer is a polyester containing ethylenically unsaturated units capable of copolymerization with the monomer capable of yielding finally a thermoset hardened, infusible, insoluble resin. Desirably, but not necessarily, the solubilizing vinyl monomer is employed in the mixture in an amount of 5 to 75, preferably 30 to 50, percent by weight of the monomer-polyester mixture.

The unsaturated polyester is prepared in conventional fashion. Accordingly, the reaction can be carried out at temperatures of about 150 to 250° C. in an atmosphere of inert gas, such as nitrogen, or carbon dioxide, water formed during reaction being removed by distillation. If desired, the esterification reaction may be catalyzed by acids or acid salts, soluble in the reaction mixture, for example, p-toluene sulfonic acid. Premature cross-linking of the double bonds during esterification and consequently gelation, may be obviated by the use of inhibitors, such as hydroquinone, resorcinol, pyrogallol, tertiarybutyl catechol, phenylene diamines, aniline, benzaldehyde or ascorbic acid. While in general equimolecular proportions of glycol and dibasic acid can be employed, a slight stoichiometric excess of glycol from 3 to 5 mol percent over combined acid material is preferably employed to compensate for loss of glycol material during reaction. The extent of reaction can be followed by acid number determinations (acid number being defined as the number of milligrams of potassium hydroxide equivalent to the free acid in one gram of resin) and by viscosity determinations in an appropriate solvent, in accordance with common practice acid number determinations alone being satisfactory where the manufacturing process has been standardized. In general, polyesterification is conducted to a resin of acid number below 50, and preferably below 30. The unsaturated polyesters may be derived from the condensation of (a) one mol of an aliphatic glycol, such as those listed in Group I, with about one mol of an unsaturated aliphatic dicarboxylic acid, such as those listed in Group II; (b) one mol of an ethylenically unsaturated aliphatic glycol, such as those listed in Group III, with about one mol of a saturated dicarboxylic acid, such as those listed in Group IV; (c) about one mol of an aliphatic glycol, such as those listed in Group I, with from 0.1 to 1 mol of an ethylenically unsaturated dicarboxylic acid, such as those listed in Group II, and from 0.9 to 0 mol of a saturated dicarboxylic acid, such as those listed in Group IV; or (d) about one mol of mixed saturated and unsaturated glycols, such as those listed in Groups III and I, respectively, with one mol of saturated dicarboxylic acids, such as those listed in Group IV, or one mol of mixed saturated and unsaturated dicarboxylic acids, such as those listed in Groups IV and II, respectively. In addition, small amounts of the glycols and/or dicarboxylic acids can be replaced, respectively, by small amounts of other polyhydric alcohols, such as glycerin, or other polycarboxylic acids, such as pyromellitic acid; and any of the polycarboxylic acids can be employed as the corresponding anhydrides.

GROUP I (Saturated glycols)

| | |
|---|---|
| Ethylene glycol | Polyethylene glycol |
| Diethylene glycol | Tetramethylene glycol |
| Triethylene glycol | Pentamethylene glycol |
| 1,3-trimethylene glycol | Hexamethylene glycol |
| 1,2-propylene glycol | Octamethylene glycol |
| Dipropylene glycol | Tetraethylene glycol |
| Butylene glycol | Xylylene diol |
| Styrene glycol | 1,1'-isopropylidene bis |
| Halogen substituted | (p-phenoxy) di-2 |
| glycols of the above | propanol |

GROUP II (Unsaturated diacids)

| | |
|---|---|
| Maleic acid | Ethyl maleic acid |
| Fumaric acid | Chloromaleic acid |
| Itaconic acid | Bromomaleic acid |
| Mesaconic acid | Chlorofumaric acid |
| Citraconic acid | Bromofumaric acid |

GROUP III (Unsaturated glycols)

| | |
|---|---|
| Butene diol | 1,6-hexene-2 diol |
| Butyne diol | 1,5-pentene-2 diol |
| 1,6-hexene-3 diol | |

GROUP IV (Saturated polyacids)

| | |
|---|---|
| Phthalic acid | Oxalic acid |
| Isophthalic acid | Malonic acid |
| Terephthalic acid | Glutaric acid |
| Tetrachlorophthalic acid | Pimelic acid |
| Succinic acid | Biphenyldicarboxylic acid |
| Adipic acid | Naphthalene dicarboxylic acid |
| Suberic acid | |
| Azelaic acid | Cyclohexane dicarboxylic acid |
| Dimethyl succinic acid | |
| Hexachloroendomethylene tetrahydro phthalic acid | Pyrotartaric acid |
| | Sebacic acid |

In a preferred embodiment of the invention the copolymerization of the fluid copolymerizable mixture to the B-stage is initiated at a relatively low temperature, for example, in the range of 25° C. to 65° C. Accordingly, it is desirable to initiate the copolymerization of the fluid mixture with so-called low temperature addition polymerization catalysts which are activated at temperatures below 65° C. such as methylethylketone peroxide, methyl isobutyl ketone peroxide, cyclohexanone peroxide, cumene hydroperoxide and t-butyl hydroperoxide. These room temperature catalysts are generally employed in the presence of an accelerator or promoter known to the art. These include metallic salt driers, such as cobalt or manganese naphthenate or octoate; oxides and hydroxides of metals in Group 2A such as barium, strontium, magnesium and calcium; quaternary ammonium compounds; mercaptans such as dodecyl mercaptan; multivalent metals in the lower oxidation state, such as $SnCl_2$; alkali metal sulfonates; and tertiary amines, such as dimethyl aniline or triethanol amine. These accelerators are generally used in from 0.001 to 1.0 weight percent, based on polyester and monomer.

As mentioned heretofore, copolymerization of the B-staged copolymerizable solids to the final cured, infusible state can be initiated in a number of ways. The initiation can be accomplished thermally, with or without a catalyst or initiator in the copolymerizable solid. If desired, additional polymerization catalyst can be added and the polymerization carried to completion, the temperature being again dependent on half-life of the initiator used.

However, in the preferred embodiment wherein a low-temperature catalyst is employed in the B-stage operation, reaction is brought to completion by incorporating in the solids a high-temperature addition polymerization catalyst which will be activated thermally at temperatures above the peak exotherm of the first stage copolymerization of the fluid mixture. Accordingly, this high temperature catalyst can be incorporated in the original fluid mixture and is unaffected by the partial polymerization of that mixture. The copolymerization of the B-staged copolymerizable solids can then be accomplished merely by heating the B-staged material to the temperature at which the high temperature catalyst is activated. Suitable high temperature catalysts for this purpose are the peroxide catalysts which are thermally stable at temperatures up to about 65° C. and are activated thermally at temperatures above about 65° C. Suitable high temperature catalysts of this type, in amounts of 0.1 to 5, preferably around 2%, based on polyester and vinyl monomer, are benzoyl peroxide, lauroyl peroxide, ditertiarybutyl peroxide, 2,4-dichlorobenzoyl peroxide, p-chlorobenzoyl peroxide, and dicumyl peroxide.

The invention, having been described in detail, is further illustrated by the following exemplification.

*Example 1*

(a) *Preparation of polyester.*—A copolymerizable mixture of styrene and a polyester derived from propylene glycol, isophthalic acid and maleic anhydride, and having an isophthalic acid to maleic anhydride mol ratio of 1:1, was prepared as follows: Propylene glycol, 51.0 kg. (0.673 kg. mol) and isophthalic acid, 53.1 kg. (0.320 kg. mol) were charged to a reaction vessel equipped with temperature controls and agitator, nitrogen inlet, and reflux condenser. The mixture was heated to a temperature of 204° C. for 7 hours while bubbling nitrogen therethrough until the acid number of the mixture was less than 5. Maleic anhydride, 31.4 kg. (0.320 kg. mol) and propylene glycol to replace that lost by distillation with first heating step, were then charged to the vessel, and the mixture was heated to a temperature of 215° C. over a period of 13 hours until the acid number of the mixture was 15. A 95.4 kg. portion of the polyester thus produced was cooled to room temperature, shattered, and ground to a fine powder and mixed with 63.6 kg. of styrene, and the mixture was stirred at room temperature for a period of 3 hours, until a homogeneous mixture was obtained.

(b) The following tabulated data illustrate the preparation of modified polyesters and the effects of different quinones in the modifier combination.

To separate batches of a polyester-styrene solution prepared as in (a) were added 1% dicumyl peroxide, 0.6% cobalt naphthenate, 0.6% methylethylketone peroxide, and 22.8 kg. mols of the indicated quinone per million kgs. of polyester plus styrene (mol ratio of quinone: initiator=1:1.5). The time to partially polymerize to a solid at about 25° C. and the percent polymerization after intervals of time are given in Table I. The solidification or gelling of the resin is easily observed as follows. A sample of the catalyzed mixture is placed in a test tube in a 25.5° C. bath, whereupon 5-millimeter glass beads are dropped into the sample. The gel time is taken as the earliest time after catalysis of the mixture at which the bead will not sink to the bottom of the test tube.

The percent polymerization of the gelled sample is determined by comparing the heat rise during further polymerization of a 50 g. sample in a 150-ml. beaker in a 114° C. bath with the heat rise from the complete polymerization of a sample in which no polymerization has occurred previously.

TABLE I.—EFFECT OF DIFFERENT QUINONES

| Ex. No. | Quinone Added | Time to Polymerize to Solid or Gel | Percent Polymerized 1 Hr. After Solidification | Percent Polymerized After— | | |
|---|---|---|---|---|---|---|
| | | | | 1 wk. | 1 mo. | 2 mos. |
| 2 | None | 17 min | 100 | 100 | 100 | 100 |
| 3 | p-Benzoquinone | >4 mos | | 0 | 0 | 0 |
| 4 | p-Toluquinone | >3.5 mos | | 0 | 0 | 0 |
| 5 | 1,4-naphthoquinone | 167 min | 20 | 30 | 40 | 70 |
| 6 | 1,2-naphthoquinone | >6 mos | | 0 | 0 | 0 |

A consideration of the Table I indicates that no B-stage resin was obtained without the modifying combination (Example 2). Typical quinones are not satisfactory because they do not gel, as shown in Examples 3 and 4. Table I further shows that 1,4-naphthoquinone (Example 5) is the best, because gelation time is short and a stable B-stage resin is obtained (Example 5). On the other hand a closely related compound 1,2-naphthoquinone is unsatisfactory (Example 6).

The following examples illustrate the effect of varying the molar ratio of 1,4-naphthoquinone to initiator or catalyst. Substantially the same conditions and materials were used in making the evaluation as those used in the above tabulated examples, except that the amount of 1,4-naphthoquinone was varied to give the ratios indicated.

TABLE II.—EFFECT OF VARYING MOLAR RATIO OF 1,4-NAPHTHOQUINONE

| Ex. No. | Mol Ratio Quinone to Initiator | Time to Polymerize to Solid (Gel Time) | Percent Polymerized 1 Day After Solidification | Percent Polymerized After— | | |
|---|---|---|---|---|---|---|
| | | | | 1 wk. | 1 mo. | 2 mos. |
| 7 | 4:1 | >2 mos | | 0 | 0 | 0 |
| 8 | 3:1 | >2 mos | | 0 | 0 | 0 |
| 9 | 2:1 | 2,000 min | 10 | 20 | 20 | 30 |
| 10 | 1:1 | 300 min | 15 | 25 | 30 | 40 |
| 11 | 1:1.5 | 167 min | 20 | 30 | 40 | 70 |
| 12 | 1:2 | 120 min | 30 | 40 | 50 | 80 |
| 13 | 1:3 | 65 min | 50 | 60 | 90 | 100 |
| 14 | 1:15 | 10 min | 100 | | | |

It is apparent from an inspection of Table II that a mol ratio of 1,4-naphthoquinone to initiator varying from 1:2.5 to 2.5:1 is indeed critical (Examples 9 and 12). High mol ratios fail even to polymerize (Examples 7 and 8). Low mol ratios give too high a degree of polymerization. Polymerization beyond 50% yields materials which are not moldable (Examples 13 and 14).

*Example 15*

*Preparation of laminated article.*—A copolymerizable mixture of styrene and a propylene glycol, isophthalic acid, and maleic anhydride unsaturated polyester having a mol ratio of isophthalic acid to maleic anhydride of 1:1, was prepared by a procedure in Example 1. Seventy parts by weight of this copolymerizable mixture was dissolved in 30 parts by weight of acetone, and 1.17 weight percent based on the weight of the polyester styrene solution of 1,4-naphthoquinone was added thereto. To this mixture was added 1 weight percent of Lupersol DDM catalyst and 0.6 weight percent cobalt naphthenate, these materials acting as a low temperature catalyst for initiation of the first stage polymerization at about 25° C. To this mixture was added 1 weight percent of dicumyl peroxide, which acted as a high temperature polymerization catalyst for the second stage of the polymerization. The mixture was then placed in a shallow pan, and a fiberglass cloth was dipped in the solution, immediately run between steel rollers to roll excess copolymerizable solution off of the cloth, and the cloth was hung in the open air. The copolymerizable mixture in the impregnated cloth set up very rapidly to a dry solid, leaving the impregnated cloth tack-free and very flexible.

After a given period of time, i.e., after about two months, the mat was cut into strips, and a stack of 12 strips was placed in a press and heated to 140° C. to initiate the second stage of the polymerization whereby a strong 12-ply laminated article was made with the adjacent plies bonded together by copolymerization of the copolymerizable mixtures impregnated therein.

*Example 16*

Substantially the same procedure was used as in the examples of Table I except that cyclohexanone peroxide was used in place of methylethylketone peroxide. Comparable results were obtained and the product remained "B"-staged in excess of one month.

*Example 17*

Substantially the same procedure was used as in the examples of Table I except that benzoyl peroxide was used in place of methylethylketone peroxide. Comparable results were obtained.

*Example 18*

Substantially the same procedure was used as in the examples of Table I except that di-t-butyl peroxide was used in place of dicumyl peroxide. Comparable results were obtained.

I claim:
1. A process for producing a stable B-staged form of a copolymerized unsaturated polyester ethylenically unsaturated monomer composition which comprises forming a fluid mixture of an unsaturated polyester and 5 to 75% by weight, based on said mixture, of an ethylenically unsaturated copolymerizable monomer, incorporating in said mixture 0.005 to 5.0% by weight of an organic peroxide free radical initiator which is capable of activation at temperatures below about 65° C. and an amount of 1,4-naphthoquinone such that the mol ratio of 1,4-naphthoquinone to initiator ranges between 1:2.5 to 2.5:1 and thereafter activating said initiator at a temperature below about 65° C.

2. The process of claim 1 further characterized in that a catalytic amount of a second organic peroxide free radical initiator is incorporated in said fluid mixture, said second initiator being thermally stable up to about 65° C.

3. An unsaturated polyester composition comprising (1) a fluid mixture of an unsaturated polyester and 5 to 75% by weight, based on said mixture, of an ethylenically unsaturated copolymerizable monomer and (2) a catalytic amount of an organic peroxide free radical initiator which is capable of activation at temperatures below about 65° C. and (3) an amount of 1,4-naphthoquinone such that the mol ratio of the 1,4-naphthoquinone to initiator is within the range of 1:2.5 to 2.5:1.

4. Composition of claim 3 in which the peroxide initiator is present in an amount of 0.01 to 5% by weight of said fluid mixture.

5. Composition of claim 3 containing, in addition, a catalytic amount of a second organic peroxide free radical initiator, said second initiator being thermally stable up to about 65° C.

6. In the process of forming a B-staged gel prepreg involving the impregnation of a fibrous filler with a resinous mixture of an unsaturated polyester copolymerizable with an ethylenically unsaturated monomer, the improvement of impregnating said filler with said resinous mixture containing 0.01 to 5% based on said mixture of an organic peroxide free-radical polymerization initiator and 1,4-naphthoquinone in a mol ratio to the free-radical polymerization initiator ranging from 1:2.5 to 2.5:1.

7. Improvement according to claim 6, wherein the resinous mixture contains in addition a catalytic amount of a high temperature free-radical polymerization initiator.

References Cited by the Examiner
UNITED STATES PATENTS 2,610,168   9/1952   Anderson _____ 260—866
3,146,216   8/1964   Salgado et al. _____ 260—863

OTHER REFERENCES
Chem. Abstracts, vol. 53, pp. 21842i, 21843b.

MURRAY TILLMAN, *Primary Examiner.*

SAMUEL H. BLECH, J. T. GOOLKASIAN,
*Assistant Examiners.*